(12) United States Patent
Youlios et al.

(10) Patent No.: US 10,216,225 B2
(45) Date of Patent: Feb. 26, 2019

(54) PROTECTIVE CASE FOR USE WITH A MOBILE DEVICE

(71) Applicants: George D. Youlios, Woodland Park, NJ (US); George O. Podd, Lake Forest, IL (US)

(72) Inventors: George D. Youlios, Woodland Park, NJ (US); George O. Podd, Lake Forest, IL (US)

(*) Notice: Subject to any disclaimer, the term of this patent is extended or adjusted under 35 U.S.C. 154(b) by 0 days.

(21) Appl. No.: 15/916,408

(22) Filed: Mar. 9, 2018

(65) Prior Publication Data

US 2018/0196474 A1    Jul. 12, 2018

Related U.S. Application Data

(63) Continuation of application No. 15/422,606, filed on Feb. 2, 2017, now Pat. No. 9,915,975.

(60) Provisional application No. 62/388,634, filed on Feb. 3, 2016.

(51) Int. Cl.
| | | |
|---|---|---|
| *H04B 1/3888* | (2015.01) | |
| *H04M 1/02* | (2006.01) | |
| *G06F 1/16* | (2006.01) | |
| *H04N 7/18* | (2006.01) | |

(52) U.S. Cl.
CPC ......... *G06F 1/1628* (2013.01); *H04B 1/3888* (2013.01); *H04N 7/185* (2013.01)

(58) Field of Classification Search
CPC ...... H04B 1/38; H04B 1/3888; H04B 1/3883; H04B 1/38887; H04M 1/02; H04M 1/0202; H04M 1/0206; H04M 2001/0204; H04N 7/18

See application file for complete search history.

(56) References Cited

U.S. PATENT DOCUMENTS

| | | | | |
|---|---|---|---|---|
| 9,037,128 B2* | 5/2015 | Yang | ................. | H04N 5/23203 455/419 |
| 9,473,190 B1* | 10/2016 | Sandlofer | ............ | G03B 17/563 |
| 2013/0005401 A1* | 1/2013 | Rosenhan | ............ | G06F 1/1626 455/557 |
| 2014/0124521 A1* | 5/2014 | Brown | ................... | H05K 5/023 220/756 |
| 2015/0194833 A1* | 7/2015 | Fathollahi | ............. | H02J 7/0044 320/114 |
| 2015/0270734 A1* | 9/2015 | Davison | ................ | H02J 7/0054 320/103 |
| 2016/0049983 A1* | 2/2016 | Ripka | ................... | H04B 1/385 455/575.6 |

(Continued)

*Primary Examiner* — Blane Jackson
(74) *Attorney, Agent, or Firm* — The Farrell Law Firm, P.C.

(57) ABSTRACT

A protective case for use with a mobile device is provided. The protective case includes an attachment device that is configured to couple to one of a handle assembly, a battery source, and a fascia plate when a void is provided on the protective case. When the handle assembly is coupled to the protective case, the handle assembly is configured to pivot about the protective case for moving the handle assembly from a closed configuration to an open configuration. When the battery source is coupled to the protective case, the battery source is configured to charge the mobile device, and, when the fascia plate is coupled to the protective case, the fascia plate is configured to fill the void, that is otherwise filled by one of the handle assembly and the battery source.

18 Claims, 17 Drawing Sheets

(56) References Cited

U.S. PATENT DOCUMENTS

| | | | |
|---|---|---|---|
| 2016/0070156 A1* | 3/2016 | Alster | G03B 17/563 |
| | | | 396/424 |
| 2016/0173160 A1* | 6/2016 | Gronewoller | H04B 1/3888 |
| | | | 455/575.8 |
| 2017/0019512 A1* | 1/2017 | Guerdrum | H04M 1/0264 |
| 2017/0099922 A1* | 4/2017 | Guerdrum | A45F 5/021 |

* cited by examiner

PROTECTIVE CASE FOR USE WITH A MOBILE DEVICE

PRIORITY

This application is a continuation application of U.S. application Ser. No. 15/422,606, which was filed in the U.S. Patent and Trademark Office on Feb. 2, 2017, which claims priority to U.S. Provisional Application Ser. No. 62/388,634, which was filed in the U.S. Patent and Trademark Office on Feb. 3, 2016 the entire content of each of these applications is incorporated herein by reference.

BACKGROUND

1. Field of the Disclosure

The present disclosure relates generally to a protective case for use with a mobile device, and more particularly, to a protective case including a handle apparatus, which can be used for taking a "selfie," and a power source that are interchangeably connectable to the protective case.

2. Description of the Related Art

Conventional protective cases for use with mobile devices, e.g., smart phones, are known and are configured to protect the smart phone (and its components) from damage if the smart phone is accidentally bumped or dropped. The protective case can be purchased separately and can come in a wide variety of styles, colors, and can be made from various materials (e.g., rigid/flexible plastic, rubber, metal/metal alloys, wood, bamboo, carbon fiber, combination thereof, or other suitable material) and thickness for protection.

Due to evolving sophisticated electronics and software applications, smart phones have opened up new opportunities for user interface and capabilities. For example, taking a "selfie" photograph individually (or a "group selfie") has become a popular form of self-expression and can be performed by extending one's arm forward while holding the smart phone, or by using an external "selfie stick" apparatus attached to the smart phone, to zoom away from a camera lens of the smart phone so that a user can take a photo of their self (or other suitable subject matter).

Moreover, the highly sophisticated electronics and software applications of the smart phone, typically, drain a power supply of the smart phone, e.g., when using global positioning system software (and associated electronics) that is typically provided on the smart phone.

SUMMARY

In view of the foregoing, a protective case including a handle apparatus, which can be used for taking a "selfie," and a power source that are interchangeably connectable to the protective case may prove useful in the mobile device industry.

In accordance with an aspect of the present disclosure, there is provided a protective case for use with a mobile device. The protective case includes an attachment device that is configured to couple to one of a handle assembly, a battery source, and a fascia plate when a void is provided on the protective case. When the handle assembly is coupled to the protective case, the handle assembly is configured to pivot about the protective case for moving the handle assembly from a closed configuration to an open configuration. When the battery source is coupled to the protective case, the battery source is configured to charge the mobile device, and, when the fascia plate is coupled to the protective case, the fascia plate is configured to fill the void that is otherwise filled by one of the handle assembly and the battery source.

In accordance with an aspect of the present disclosure, there is provided a protective case for use with a mobile device. The protective case includes an attachment device, a handle assembly that is configured to removably couple to the attachment device, and a battery source that is configured to removably couple to the attachment device. When the handle assembly is coupled to the protective case, the handle assembly is configured to pivot about the protective case for moving the handle assembly from a closed configuration to an open configuration and, when the battery source is coupled to the protective case, the battery source is configured to charge the mobile device.

In accordance with an aspect of the present disclosure, there is provided a protective case for use with a mobile device. The protective case includes an attachment device including at least one of at least one tab-lock area and at least one tab slot. A handle assembly that includes at least one of at least one tab-lock and at least one tab that is configured to removably couple to a corresponding one of the at least one tab-lock and the at least one tab. A battery source that includes at least one of at least one tab-lock and at least one tab that is configured to removably couple to a corresponding one of the at least one tab-lock and the at least one tab. A fascia plate that includes at least one of at least one tab-lock and at least one tab that is configured to removably couple to a corresponding one of the at least one tab-lock and the at least one tab. When the handle assembly is coupled to the protective case, the handle assembly is configured to pivot about the protective case for moving the handle assembly from a closed configuration to an open configuration. When the battery source is coupled to the protective case, the battery source is configured to charge the mobile device and, when the fascia plate is coupled to the protective case, the fascia plate is configured to fill a void that is otherwise filled by one of the handle assembly and the battery source.

BRIEF DESCRIPTION OF THE DRAWING

Various embodiments of the present disclosure are described hereinbelow with references to the drawings, wherein.

DETAILED DESCRIPTION

As noted above, a protective case including a handle apparatus, which can be used for taking a "selfie," and a power source that are interchangeably connectable to the protective case may prove useful in the mobile device industry, and such a protective case is described herein.

The protective case described herein has a low profile configuration that integrates sculpted contours which allow some of the components (accessories), e.g., a fascia plate, a handle assembly, and/or a battery source, associated with the protective case to be removably coupled to the protective case. Integrating the sculpted contour on the protective case provides the protective case with the necessary structural integrity for supporting the components associated therewith, while allowing the protective case to be manufactured with a relatively thin wall material thickness, which, in turn, provides a relatively lightweight protective case when assembled, and a manufacturing cost that is generally lower than manufacturing costs that are typically associated with conventional protective cases.

Additionally, as the protective case incorporates one or more attachment devices, a user can easily and quickly interchange some of the components that are associated with the protective case.

Figure 1:
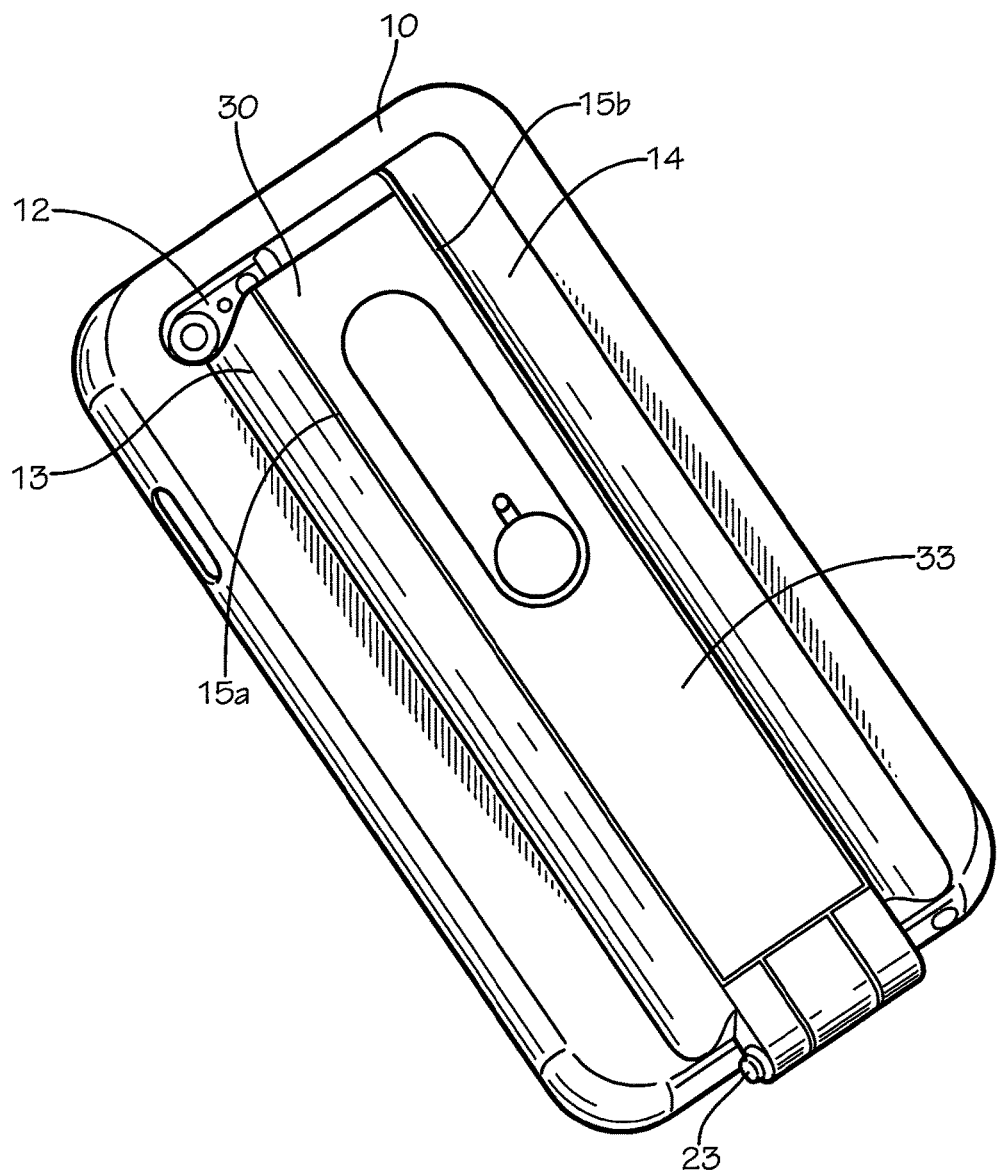
FIG. 1 is a perspective view of a protective case including a handle assembly coupled thereto for use with a mobile device, with the protective case shown coupled to the mobile device, according to an embodiment of the present disclosure.
Figure 2:
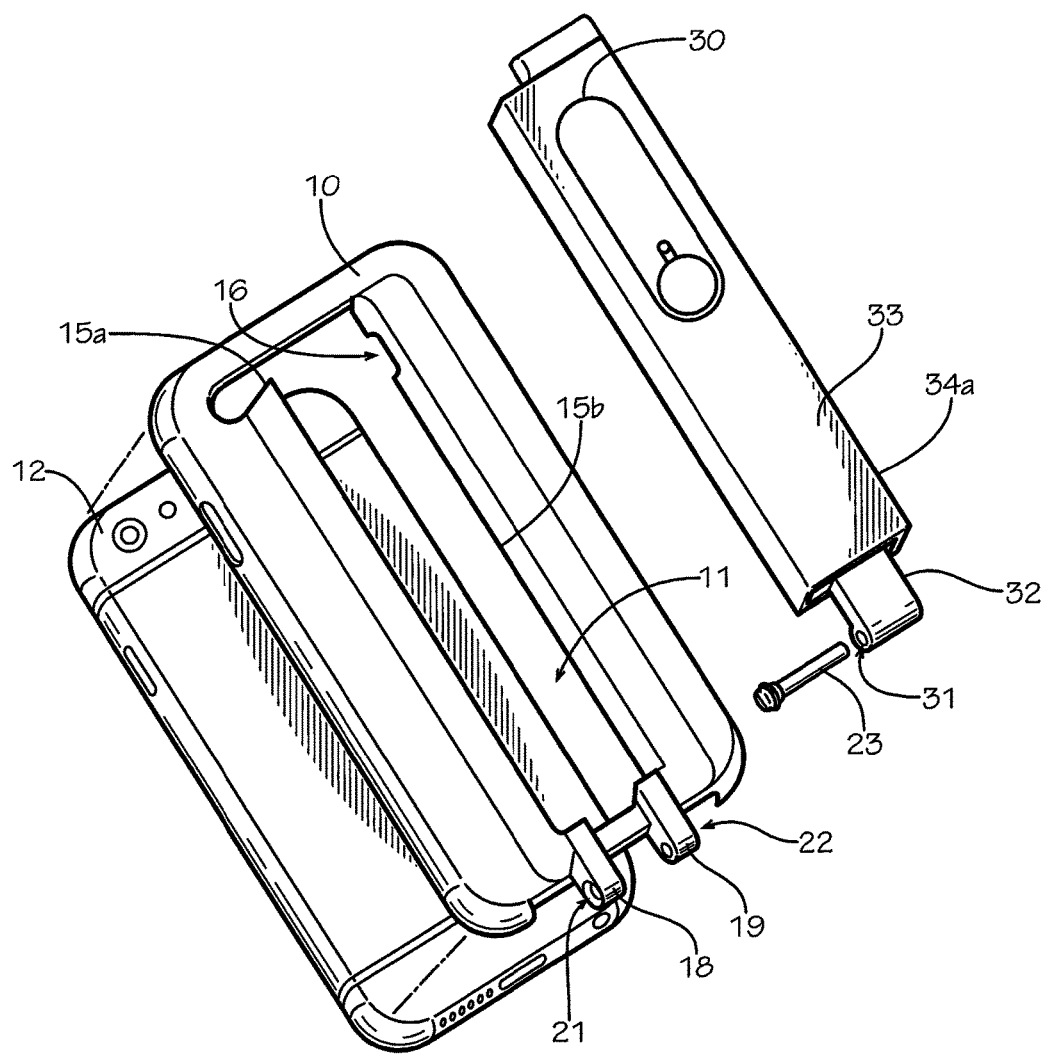
FIG. 2 is an exploded view of the protective case, the handle assembly, and the mobile device.

Referring to FIGS. 1 and 2, a protective case 10 including a handle assembly 30, which is removably coupleable thereto, for use with a mobile device 12 is shown; the mobile device 12 can be any type of mobile device including, but not limited to, a mobile phone, a tablet, etc. For illustrative purposes, the mobile device 12 is shown embodied in the form of a mobile phone.

The protective case 10 can be manufactured from any suitable material, e.g., rigid/flexible plastic, rubber, metal/metal alloys, wood, bamboo, carbon fiber, combination thereof, or other suitable material. In the illustrated embodiment, the protective case 10 is manufactured from a relatively lightweight plastic using an injection molding process; however, other manufacturing processes can be used, e.g., overmolding. Using the injection molding process allows the protective case 10 to be manufactured with sufficient flexibility thereby allowing the protective case 10 to be snapped over side edges of mobile device 12 when securing the protective case 10 to mobile device 12.

The protective case 10 can be formed with any geometric configuration so as to match a desired shape of a mobile device. For example, the protective case 10 is illustrated having a generally rectangular configuration to match the generally rectangular configuration of the mobile device 12.

The protective case 10 has a sculpted contour configuration extending along a back surface thereof thereby forming a channel (or void) 11 for receiving the one or more components associated with the protective case 10 and coupling the one or more components to the protective case 10, as will be described in greater detail below.

In the embodiment illustrated in FIGS. 1-6, the sculpted configuration is defined by a pair of raised sidewalls 13 and 14 (which function as an attachment device) each including a respective top edge 15a, 15b. The raised sidewalls 13, 14 are spaced apart from each other so that the handle assembly 30 and/or a battery source 30 can be fit therebetween for coupling the handle assembly 30 and/or the battery source 40 to the protective case 10.

Figure 3:
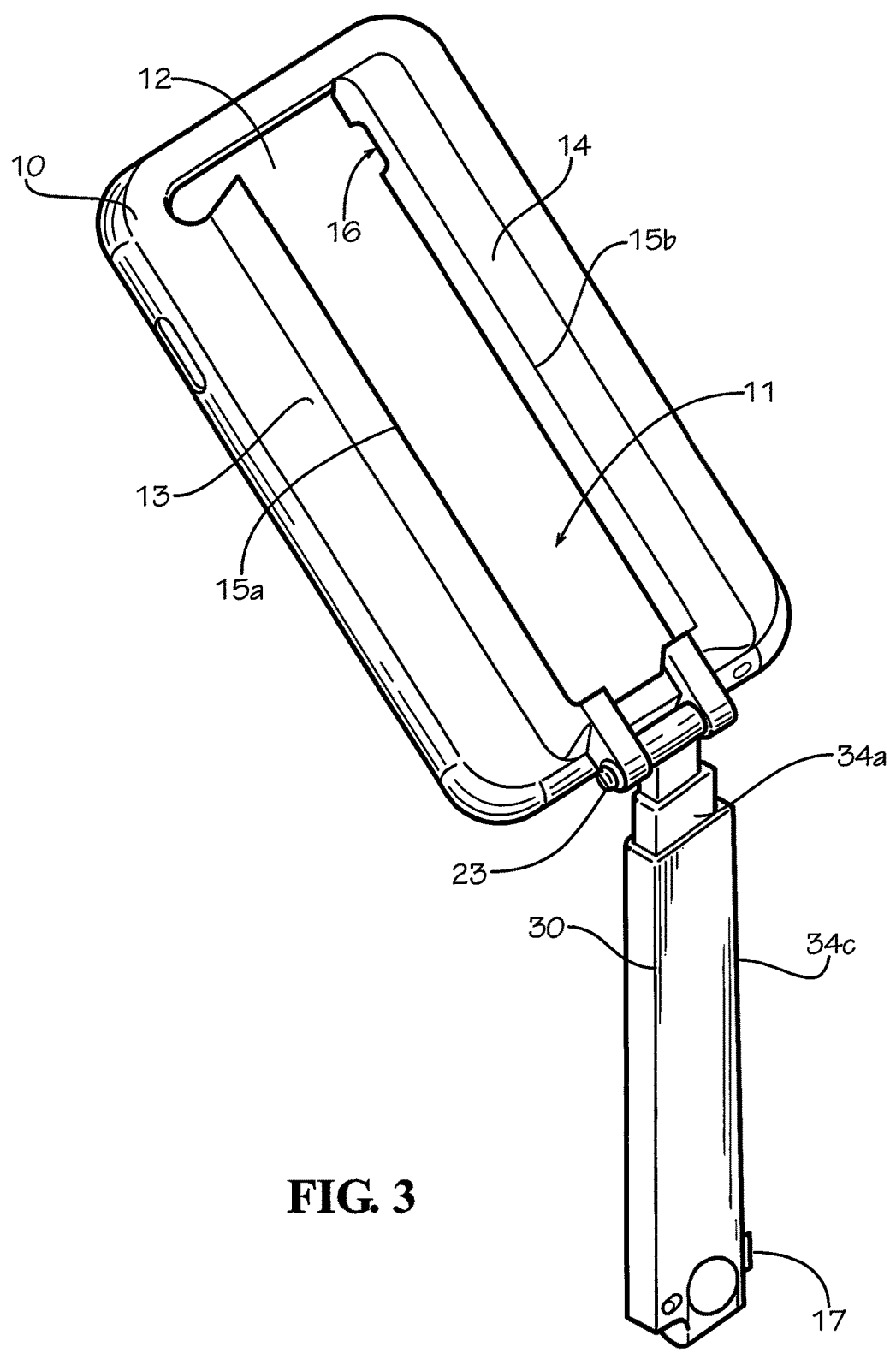
FIG. 3 is a perspective view of the protective case coupled to the mobile device, with the handle assembly shown in an open (ready-to-use) configuration.
Figure 4A:
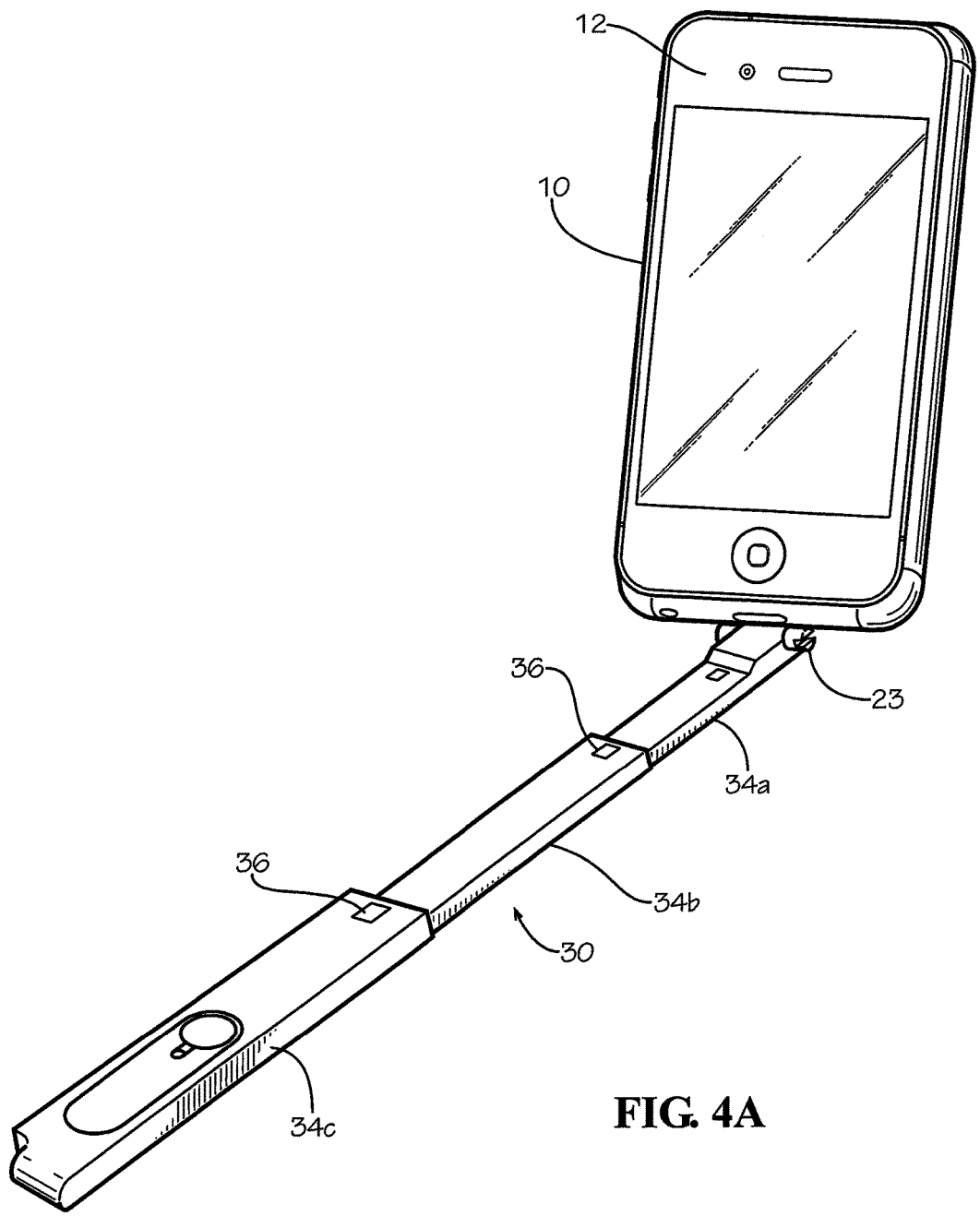
FIG. 4A is a perspective view of the protective case coupled to the mobile device, with the handle assembly shown in an extended configuration.
Figure 4B:
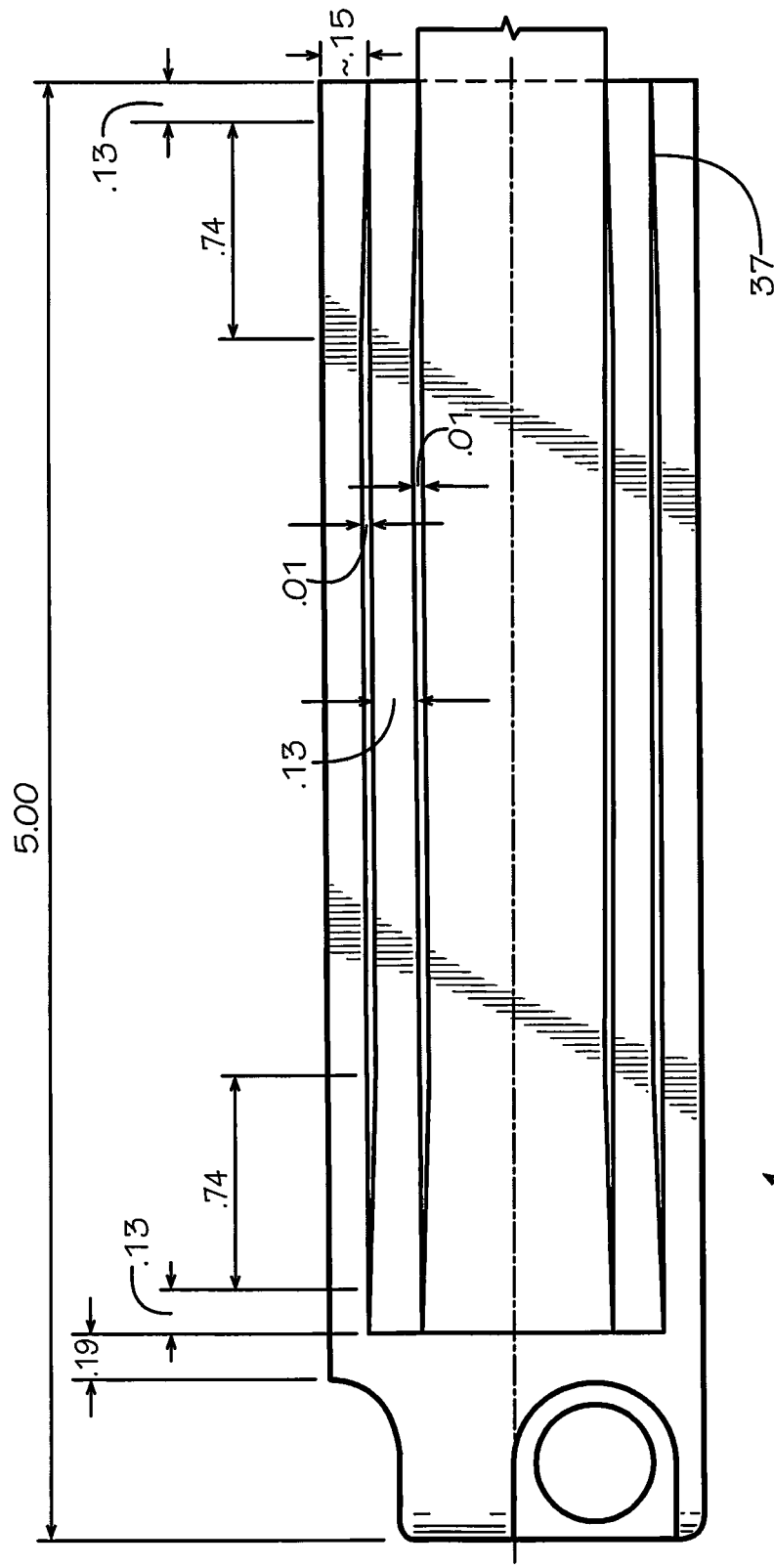
FIG. 4B is a top view of a telescoping member of the handle assembly.

One or more a snap lock areas 16 (FIGS. 2 and 3) are defined in at least one of the raised sidewalls 13, 14 and are configured to couple to a corresponding snap tab 17 (FIG. 3) that is disposed on each of the handle assembly 30 and the battery source 40 for maintaining the handle assembly 30 and the battery source 40 in the closed configuration when the handle assembly 30 or the battery source 40 is coupled to the protective case 10. In FIGS. 2 and 3, the snap lock area 16 is shown defined in the raised sidewall 14 and the corresponding snap tab 17 is shown on a corresponding sidewall of the handle assembly 30.

A pair of pivot support members 18, 19 are formed at a respective end of the raised sidewalls 13, 14 and include respective apertures 21 and 22. The apertures 21, 22 are configured to receive a cap screw 23 (or other suitable device, e.g., pin) for coupling the handle assembly 30 (or the battery source 40) to the protective case 10.

The handle assembly 30 includes a generally elongated configuration and, as noted above, is configured to fit between the raised sidewalls 13, 14 when coupling the handle assembly 30 to the protective case 10. When the handle assembly 30 is positioned between the raised walls 13, 14, an aperture 31 of a pivot member 32, which is disposed at one end the handle assembly 30, aligns with the apertures 21, 22 of the pivot support members 18, 19. With the apertures 21, 22, and 31 aligned with each other, a user can insert the cap screw 23 therethrough to couple the handle assembly 30 to the protective case 10.

Once the handle assembly 30 is coupled to the protective case 10, the handle assembly can be moved from a closed configuration (FIG. 1) to an open configuration (FIG. 3); in the closed configuration, the snap tab 17 of the handle assembly is engaged with the snap lock area 16 defined in the raised sidewall 14. Moreover, in the closed configuration, the edges 15a, 15b on the raised sidewalls 13, 14 are flush with a back surface 33 of the handle assembly 30 (or a back surface of the battery source 40), thereby providing the protective case 10 with a relatively "slim" configuration, when compared to conventional protective cases and/or selfie sticks.

In the open configuration, the handle assembly 30 is moveable from a retracted configuration (for coupling the handle assembly 30 to the protective case 10, see FIG. 2 for example), to one or more extended configurations (for allowing a user to perform at least one camera function of the mobile device 10, see FIGS. 3 and 4 for example). To this end, the handle assembly 30 includes three (or more) telescoping members that allow the handle assembly 30 to move between the one or more extended configurations. For illustrative purposes, the handle assembly 30 is shown including an inner telescoping member 34a, a middle telescoping member 34b, and an outer telescoping member 34c, which includes a button 35 for performing the at least one camera function of the mobile device 12; the button 35 can be in one of wired or wireless (Bluetooth, Zigbee, etc.) communication with the mobile device 10 for performing the at least one camera function of the mobile device 12. Additionally, the outer telescoping member 34c can include all the necessary components (e.g., batteries, circuits, printed circuit boards, indicators (light emitting diodes (LEDs)), etc.,) to control the camera functions of the mobile device 12.

An optional mechanical lock out interface 36 (shown schematically in FIG. 4A) can be integrated into the telescoping members so as not to allow a user to overextend the handle assembly 30. For example, each of the telescoping members 34a-34c can have a distal tapered end 37 that engages a corresponding proximal end of one of the other telescoping members so that each of the telescoping members 34a-34c lock out before uncoupling from one another. For example, the distal tapered end 37 of the telescoping member 34c can engage a proximal end of the telescoping member 34b. For illustrative purposes, in FIG. 4B the tapered end 37 is shown on the telescoping member 34c. Additionally or alternatively, one or more detents can be provided on the inner telescoping member 34a and can be configured to releasably engage a corresponding indent that can be provided on the middle telescoping member 34b.

The handle assembly 30 (in the open configuration, retracted or not) is pivotable about the pivot support members 21, 22 from about 0 degrees and to about 270 degrees, and the handle assembly can be maintained in any position from 0 degrees and to about 270 via a frictional axle attachment device (e.g., the cap screw 23 or other suitable device). The amount of friction that can provided by the cap screw 23 can be varied by simply turning the cap screw 23, which can include a knurled surface and/or a screw-head configuration (e.g., slotted or Philips head).

Figure 5:
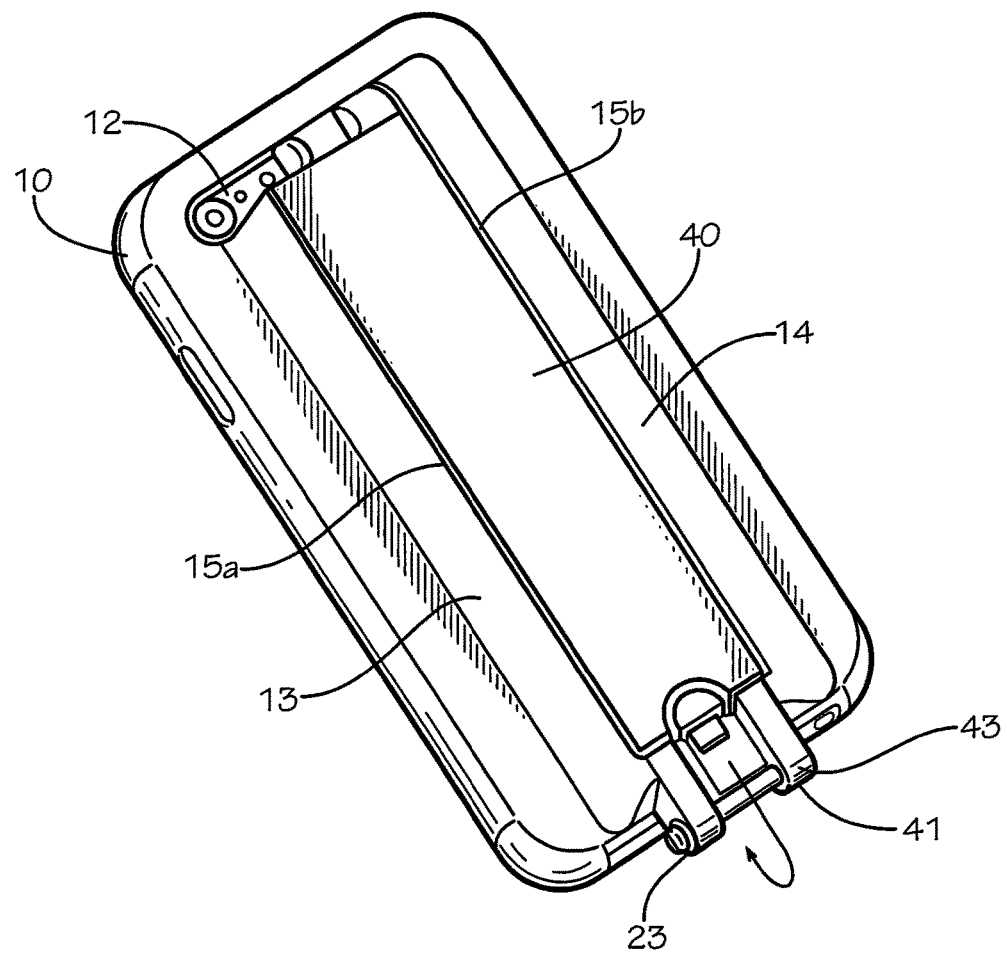
FIG. 5 is a perspective view of the protective case coupled to the mobile device, with a battery source coupled to the protective case.
Figure 6:
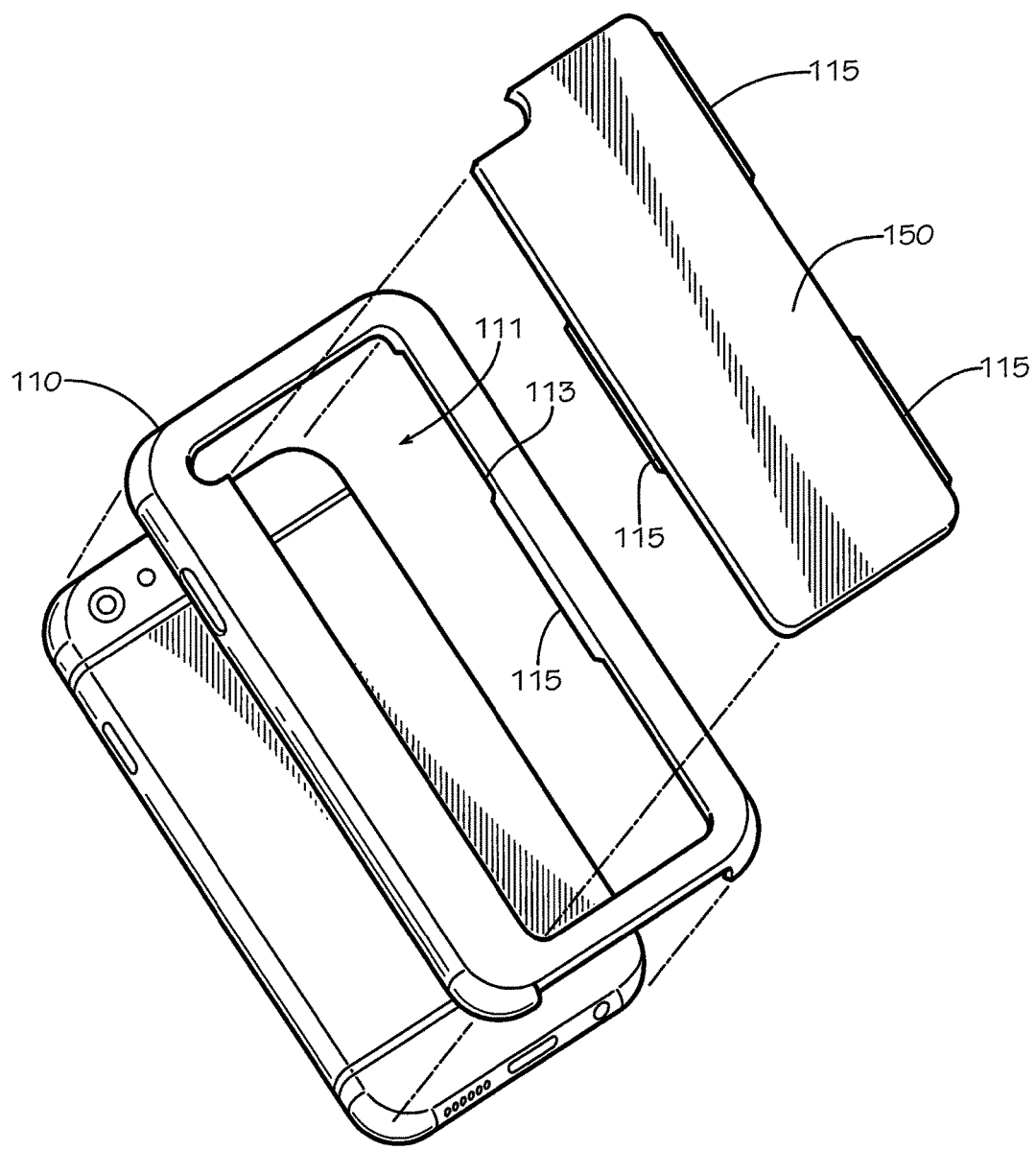
FIG. 6 is an exploded view of a protective case, a fascia plate that is configured to couple to the protective case, and the mobile device, according to an embodiment of the present disclosure.
Figure 7:
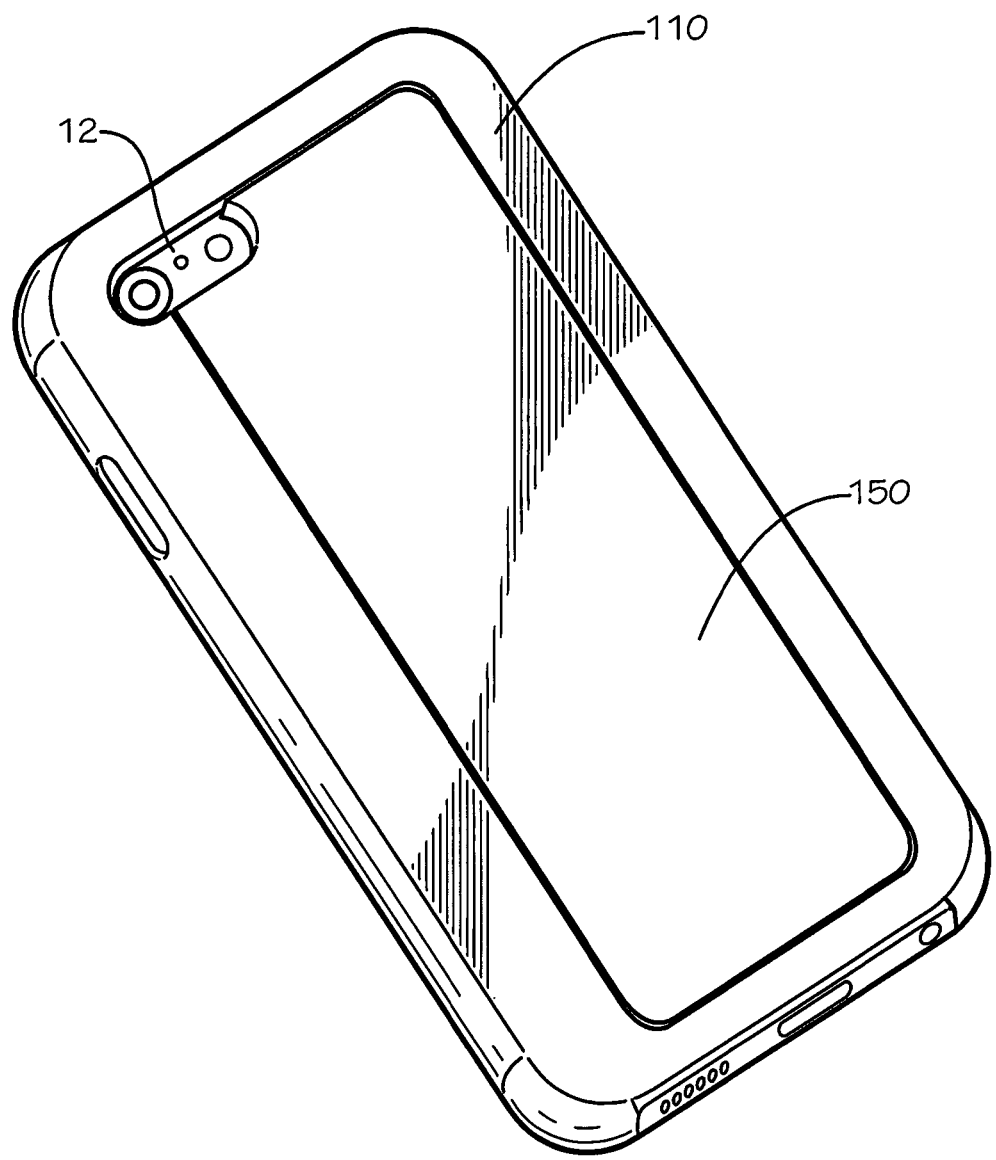
FIG. 7 is a perspective view of the protective case of FIG. 6 coupled to the mobile device, with the fascia plate coupled to the protective case.
Figure 8:
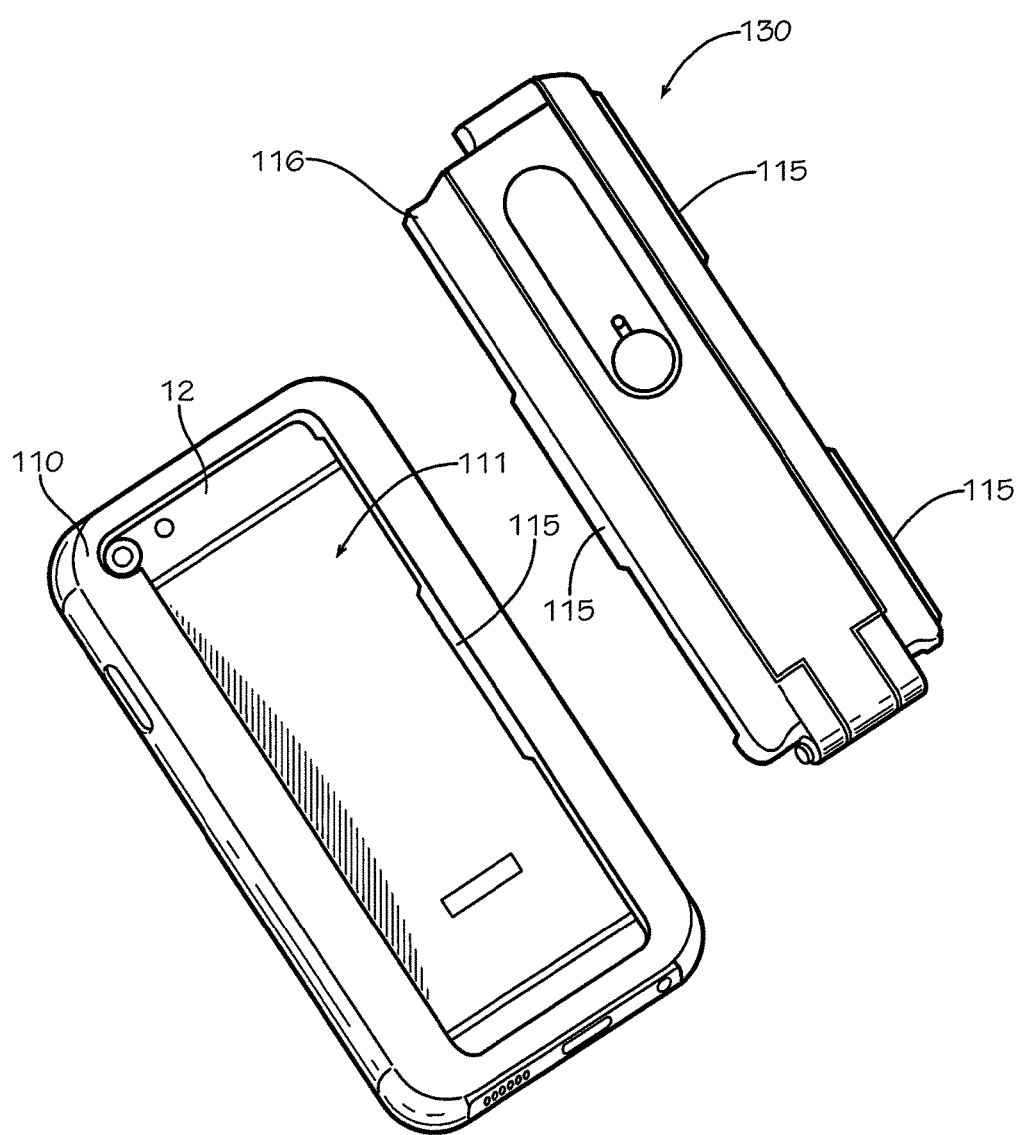
FIG. 8 is an exploded view of the protective case of FIG. 6 and the mobile device, with a handle assembly shown uncoupled from the protective case.
Figure 9:
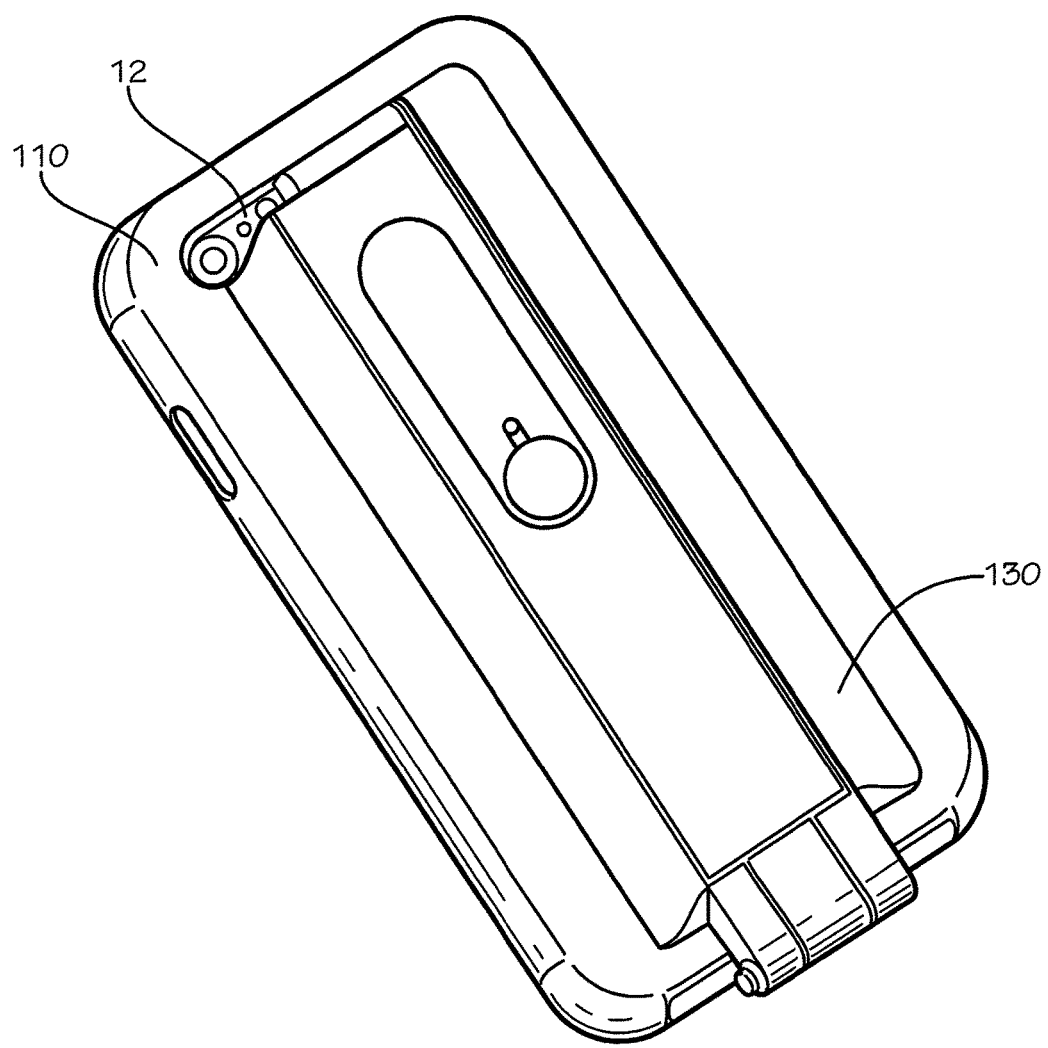
FIG. 9 is a perspective view of the protective case of FIG. 6 shown coupled to the mobile device, with the handle assembly shown coupled to the protective case.

Referring to FIG. 5, as noted above, the protective case 10 is configured to couple to the battery source 40 (e.g., a rechargeable battery), which is shown coupled to the protective case 10 in this FIG. The battery source 40 can be configured to provide additional power to the mobile device 12 when desired, i.e., if the mobile device 12 is low on battery.

Figure 11:
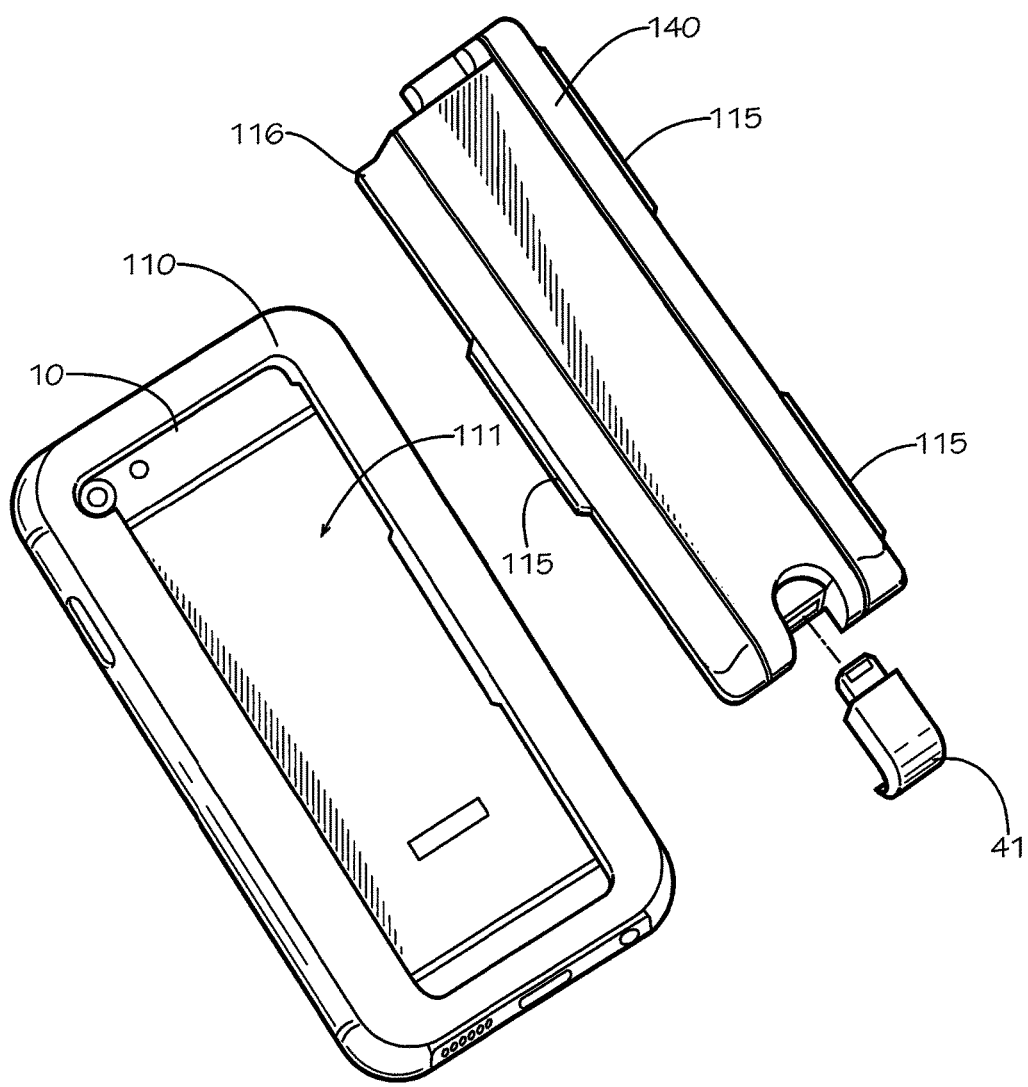
FIG. 11 is an exploded view of the protective case of FIG. 6 shown coupled to the mobile device with a battery source uncoupled to the protective case.
Figure 12:
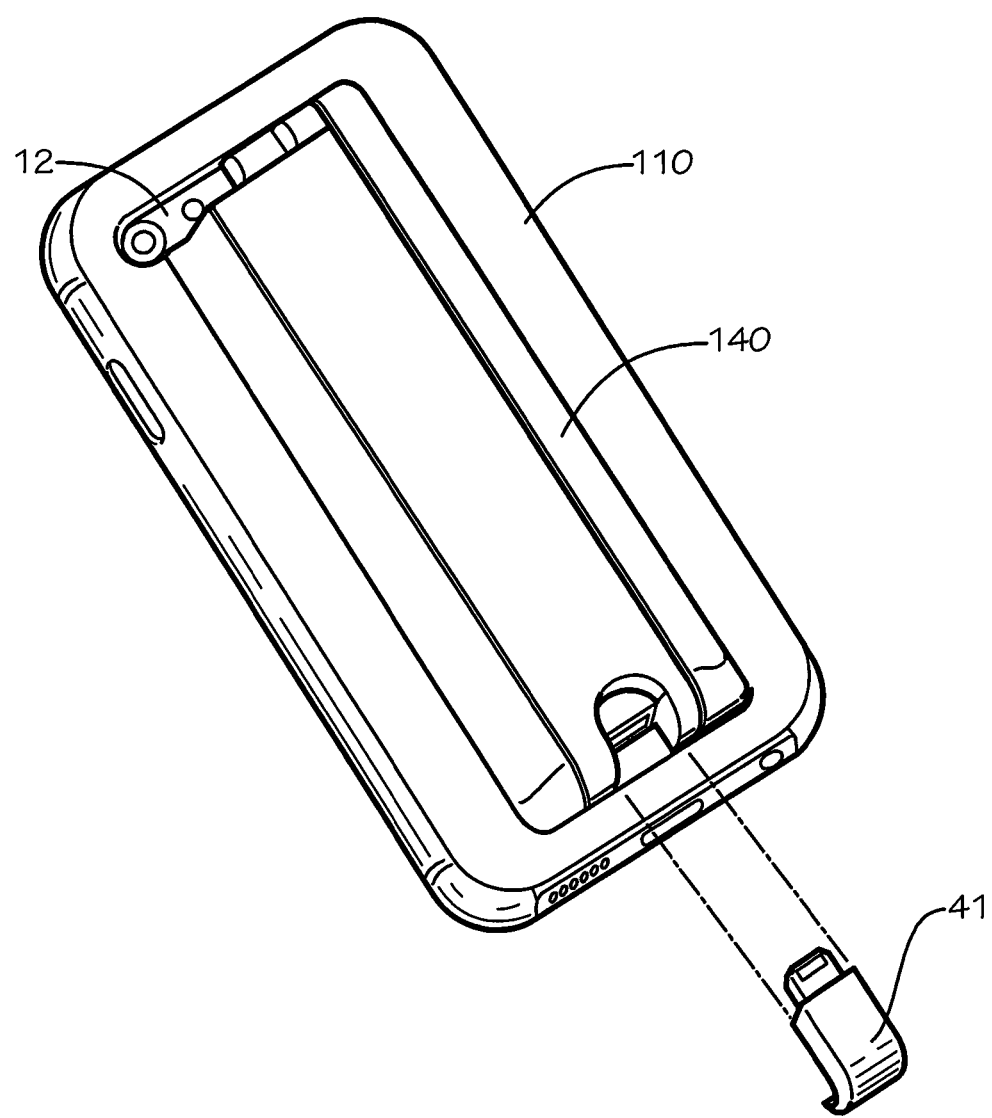
FIG. 12 is a perspective view of the protective case of FIG. 6 shown coupled to the mobile device, with the battery source coupled to the protective case.
Figure 13:
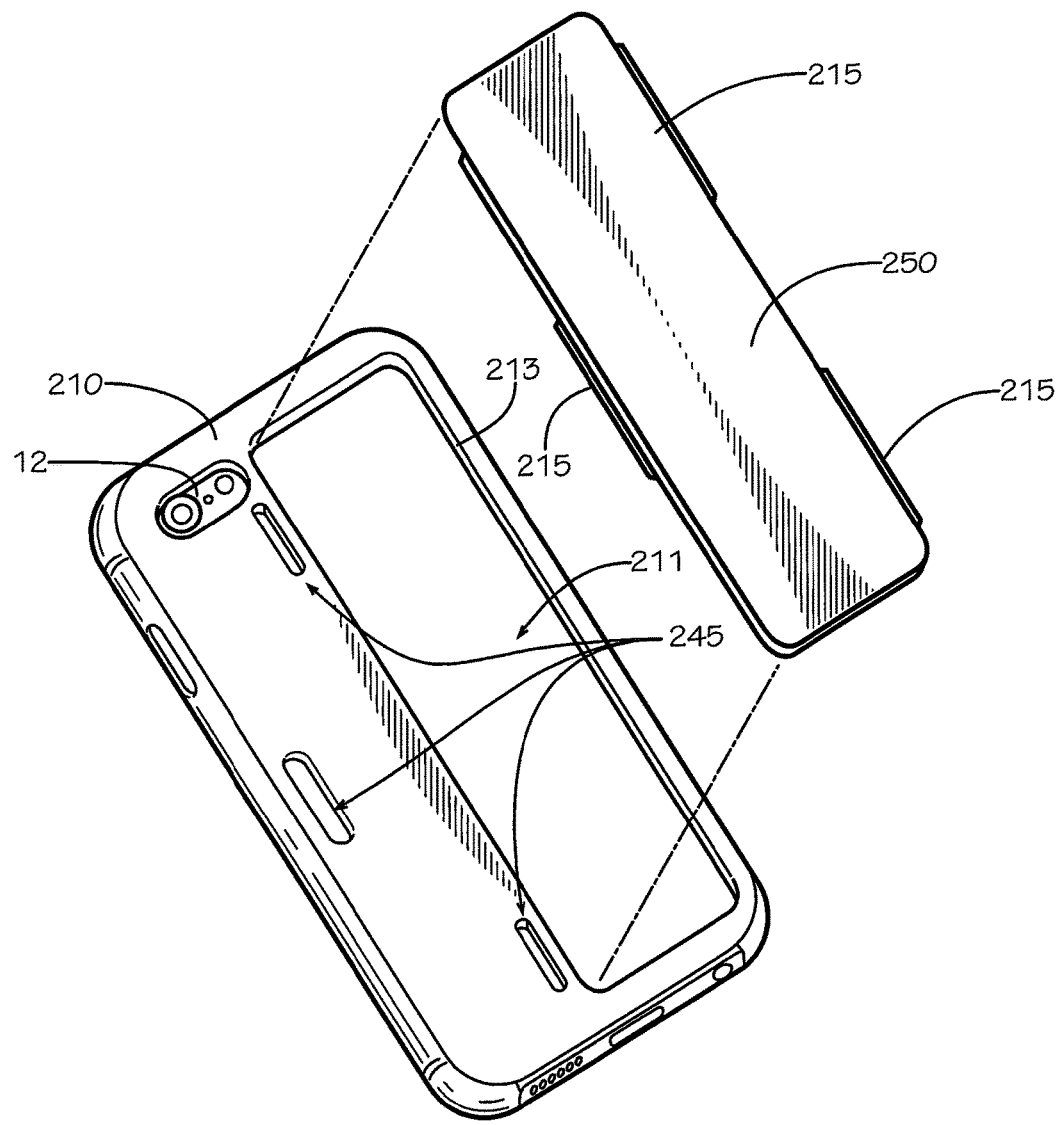
FIG. 13 is an exploded view of a protective case shown coupled to the mobile device, with a fascia plate uncoupled from the protective case, according to an embodiment of the present disclosure.

The battery source 40 can be housed in an injection molded plastic housing, which can be configured to accept various components that can be used for connecting the battery source 40 to the mobile device 12. For example, the battery source 40 can be configured to accept one or more types of plugs 41 (u-shaped plugs) that interface with a recharge port of the mobile device 12 (as best seen in FIGS. 11 and 12).

The battery source 40 can also include a separate dedicated recharging port 42 to accept a battery charging connector of the mobile device 12. An optional LED indicator(s) can be provided on the battery source 40 to show when the battery source 40 is fully charged and operational, or to show a residual amount of charge left in the battery source 40.

Similar to the handle assembly 30, the cap screw 23 is also configured to engage a pivot member 43 that is provided on one end of the plastic housing that houses the battery source 40, and while not explicitly shown in the FIGs., a snap lock tab 17, which functions in a manner as described above with respect to the handle assembly 30, can be provided on the plastic housing that houses the battery source 40. Moreover, the pivot member 43 is configured such that the u-shaped plug 41 can be inserted into the battery source 40 and over the cap screw 23 when the cap screw 23 is engaged with the pivot member 43 (FIG. 5).

In use, a user can attach the protective case 10, with the cap screw 23 coupled to the pivot support members 18, 19, to the mobile device 12. Alternatively, the cap screw 23 can be coupled the pivot support members 18, 19 after the protective case 10 is attached to the mobile device 12.

If the cap screw 23 is coupled to the pivot support members 18, 19, the user can remove the cap screw 23 from pivot support members 18, 19 and attach either the handle assembly 30 or the battery source 40 to the protective case 10 by inserting the handle assembly 30 or battery source 40 into the void 11 defined between the raised sidewalls 13, 14 and engaging the snap lock tab 17 with the corresponding snap lock area 16. Once the snap lock tab 17 is engaged with the corresponding snap lock area 16, the user can reinsert the cap screw 23 into the pivot support members 18, 19 and the pivot members 32, 43 of either the handle assembly 30 or battery source 40, respectively.

With the battery source 40 attached to the protective case 10, a user can charge the mobile device 12 using the u-shaped plug 41 (FIG. 5). Similarly, with the handle assembly 30 attached to the protective case 10, a user can move the handle assembly 30 from the closed configuration to the open configuration, and can extend the handle assembly 30 to the one or more extended configurations (FIGS. 3 and 4).

From the foregoing and with reference to the various figure drawings, those skilled in the art will appreciate that certain modifications can also be made to the present disclosure without departing from the scope of the same. For example, FIGS. 6-16 illustrate other embodiments of the protective case 10.

Referring to FIGS. 6-12, a protective case 110 that is configured to attach to the mobile device 12 is illustrated. The protective case 110 (and components associated therewith) is/are substantially identical to the protective case 10. Accordingly, only those features that are unique to the protective case 110 are described herein.

Unlike the protective case 10, which includes the void 11 that is defined by the raised walls 13, 14, the protective case 110 includes a void 111 that has at least one tab-lock area 113 that is defined along a perimeter that defines the void 111. The tab-lock area 113 is configured to engage a corresponding at least one tab-lock 115 that is disposed on a fascia plate 150 (FIGS. 6 and 7), a handle assembly 130 (FIGS. 8-10), and a battery source 140 (FIGS. 11 and 12); the fascia plate 150 is configured to fill the void 111 when the handle assembly 130 or the battery source 140 are not attached to the protective case 110.

The tab-lock 115 includes a generally elongated configuration and is defined along a peripheral edge of the fascia plate 150, the handle assembly 130, and the battery source 140. In the illustrated embodiment, three spaced-apart tab-locks 115 are provided on each of the fascia plate 150, the handle assembly 130, and the battery source 140; an optional tab-lock 115 (see FIG. 6, for example) can also be provided along the perimeter that defines the void 111.

The handle assembly 130 and the battery source 140 are mounted to a base member 116, which is basically a fascia plate that supports the handle assembly 130 and the battery source 140.

Unlike the battery source 40, the battery source 140 does not include a pivot member 43, as the battery source 140 is not configured to engage the cap screw 23.

To attach the handle assembly 130, the battery source 140, or the fascia plate 150 to the protective case 110, a user simply pushes any of these components into the void 111 until the tab-lock 115 is engaged with the tab-lock area 113. Once attached to the protective case 110, the handle assembly 130 and the battery source 140 can function as described above with respect to the handle assembly 30 and the battery source 40.

To remove the handle assembly 130, the battery source 140, or the fascia plate 150 from the protective case 110, a user simply applies a downward/inward (opposite tab engagement) pressure along a back surface of any of these components until the tab-lock 115 is disengaged from the tab-lock area 113.

Figure 10:
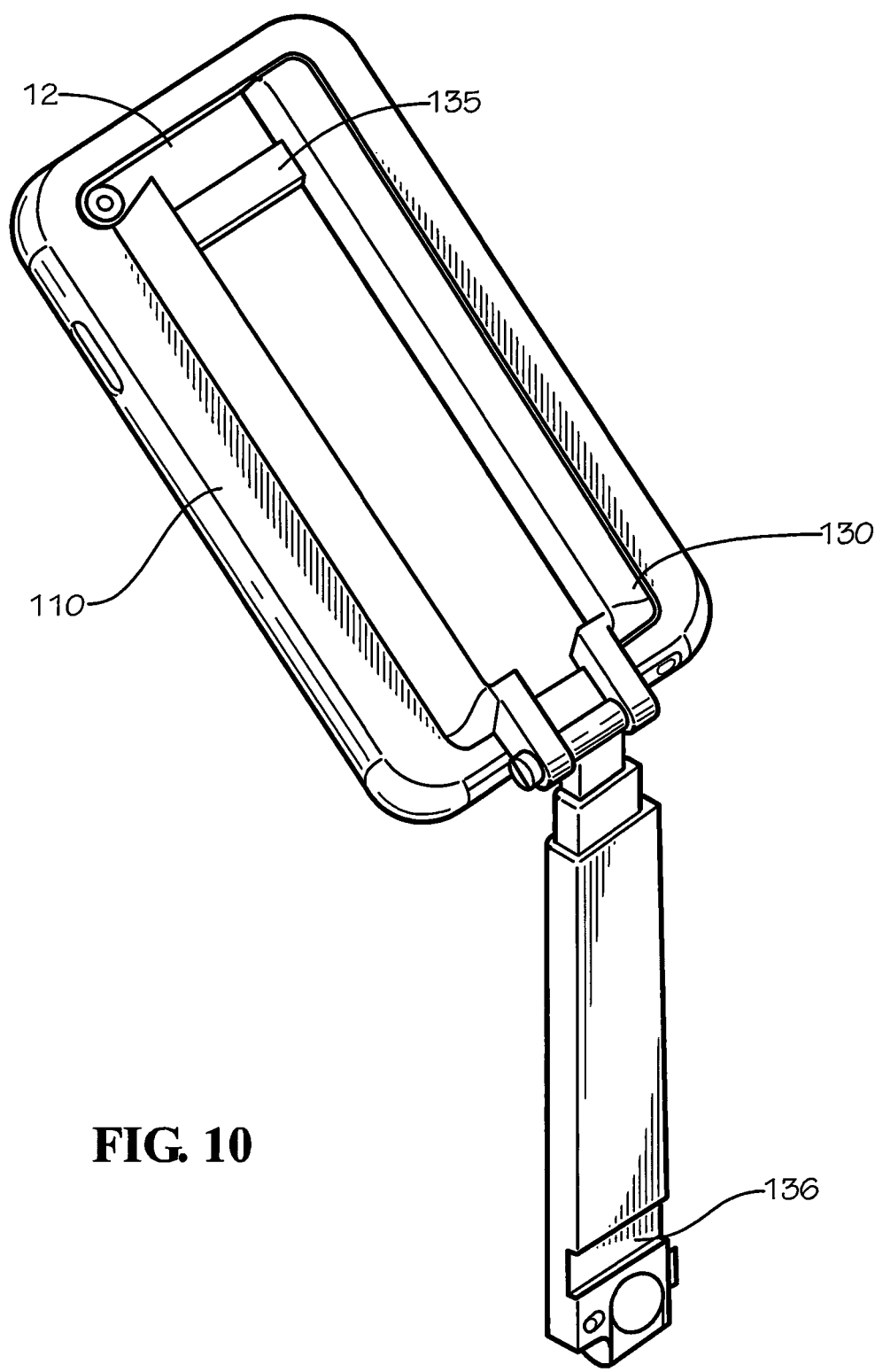
FIG. 10 is a perspective view of the protective case of FIG. 6 shown coupled to the mobile device, with the handle assembly shown in the open (ready-to-use) configuration.

Alternatively, an optional lift-off device 150, which can be grasped by a user, can be provided on the handle assembly 130, the battery source 140, or the fascia plate 150 and used for removing these components from the protective case 110. For illustrative purposes, a lift-off device 135 is shown provided on the handle assembly 130 (FIG. 10). The lift-off device 150 extends laterally between the raised sidewalls of the handle assembly 130 and is configured to engage a corresponding recess 136 that can be defined in an outer telescoping member of the handle assembly 130. As can be appreciated, other types of lift-off devices can be used, and can be configured to accommodate the specific type of component that is configured to attach to the protective case 110.

Referring to FIGS. 13-16, a protective case 210 that is configured to attach to the mobile device 12 is illustrated. The protective case 210 (and components associated therewith) is/are substantially identical to the protective cases 10/110. Accordingly, only those features that are unique to the protective case 210 are described herein.

Figure 14:
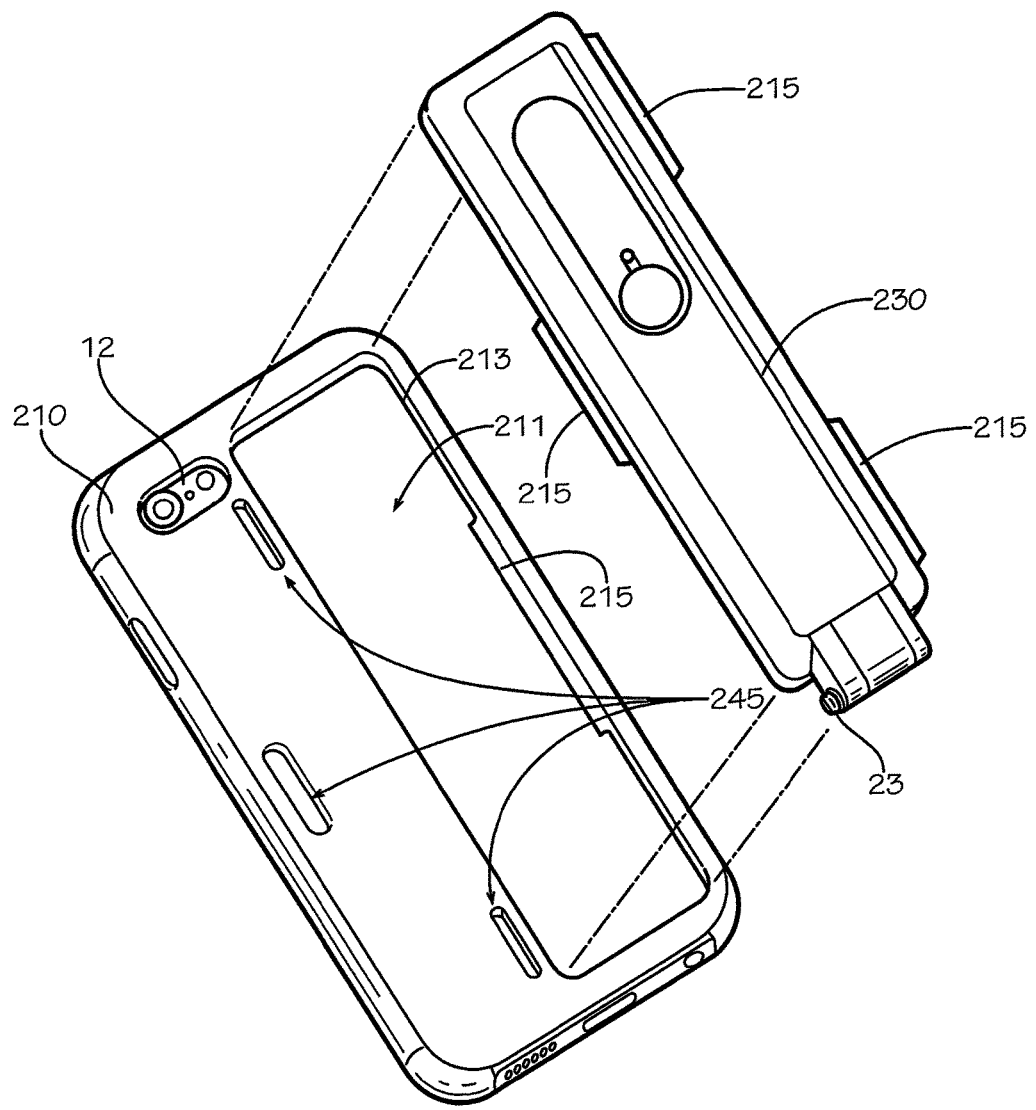
FIG. 14 is an exploded view of the protective case of FIG. 13 shown coupled to the mobile device with a handle assembly shown uncoupled from the protective case.
Figure 15:
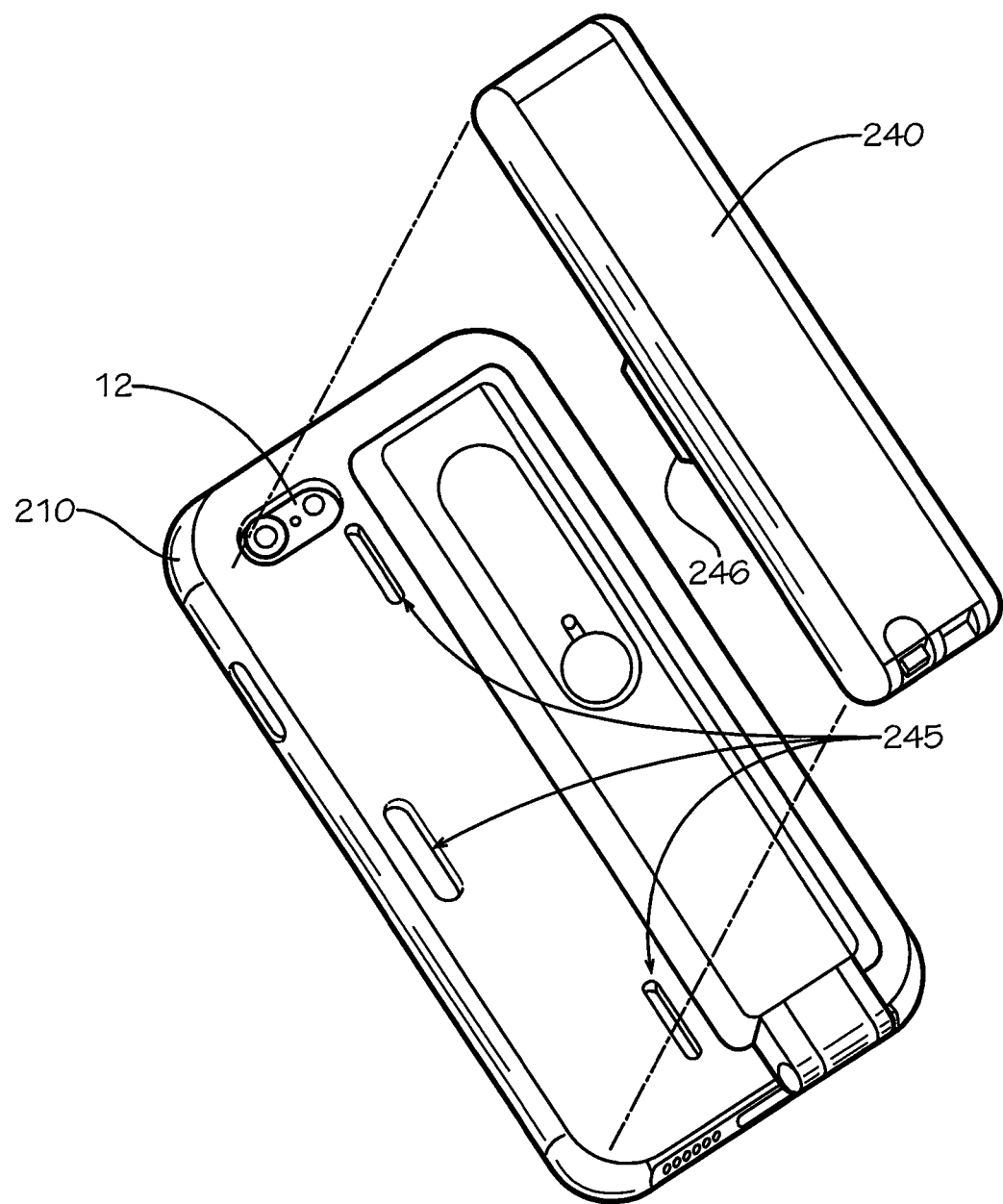
FIG. 15 is an exploded view of the protective case of FIG. 13 shown coupled to the mobile device, with a battery source shown uncoupled from the protective case.
Figure 16:
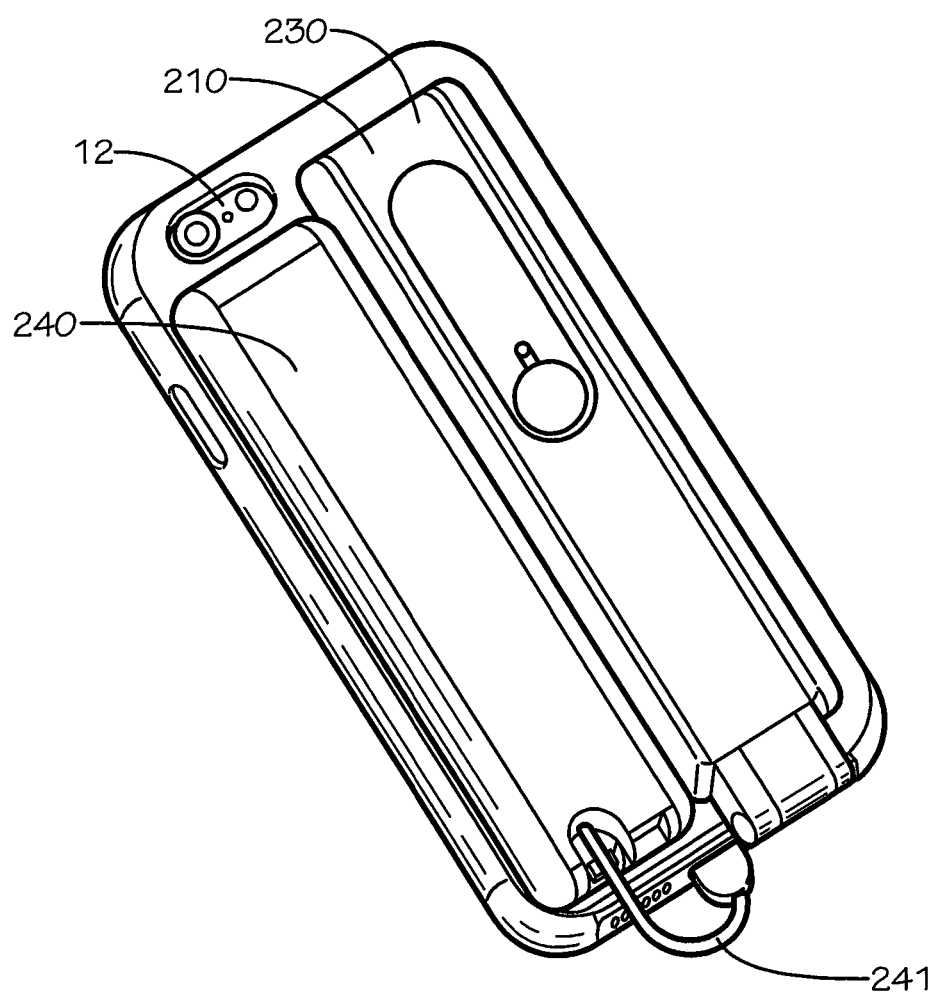
FIG. 16 is a perspective view of a protective case of FIG. 13 shown coupled to the mobile device, with a modular battery source and modular handle assembly shown coupled to the protective case, according to an embodiment of the present disclosure.

Unlike the protective cases 10/100, which are configured to attach to either one of the handle assembly or the battery source, the protective case 210 is configured to attach to both a handle assembly 230 and a battery source 240. To this end, the protective case 210 includes a void 211 that has at least one tab-lock area 213 that is defined along a perimeter that defines the void 211. The tab-lock area 213 is configured to engage a corresponding at least one tab-lock 215 that is disposed on a fascia plate 250 (FIG. 13) and the handle assembly 230 (FIG. 14). Other than the relative size of the void 211, the handle assembly 230, and the fascia plate 250, these features/components are identical to the void 111, the handle assembly 130 and the fascia plate 150.

The protective case 210 also includes at least one tab slot 245 (three tab slots 245 are shown in the FIGs.) that is defined in a back surface of the protective case 210 and is disposed adjacent the void 211. The tab slot 245 is configured to engage a corresponding at least one tab 246 that is disposed the battery source 240.

As can be appreciated, the handle assembly 230 and the fascia plate 250 can include the tab 246 and can be configured to engage the tab slot 245, and the battery source 240 can include the tab-lock 215 and can be configured to engage the tab-lock area 213; other arrangements are contemplated.

In the embodiment illustrated in FIGS. 13-16, the battery assembly 240 uses a wired plug connector 241 to connect to the mobile device 12 (see FIG. 16, for example) rather than the u-shaped plug 41; however, if the battery assembly 240 is configured to be inserted into the void 211, the battery source 240 can use the u-shaped plug 41 to connect to the mobile device 12.

To attach the battery source 240 to the protective case 210, a user can simply insert the tab 246 into the tab slot 245, and the handle assembly 230 and the fascia plate 250 can be attached to the protective case 210 in a manner as described above with respect to the handle assembly 130 and the fascia plate 150. The functionality of the handle assembly 230 and battery source 240 are identical to that of the previously described handle assemblies and battery sources.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A protective case for use with a mobile device, the protective case comprising:
   an attachment device that is configured to couple to one of a handle assembly, a battery source, and a fascia plate when a void is provided on the protective case,
   wherein, when the handle assembly is coupled to the protective case, the handle assembly is configured to pivot about the protective case for moving the handle assembly from a closed configuration to an open configuration, when the battery source is coupled to the protective case, the battery, source is configured to charge the mobile device, and, when the fascia plate is coupled to the protective case, the fascia plate is configured to fill the void that is otherwise filled by one of the handle assembly and the battery source, and
   wherein the attachment device comprises a pair of pivot support members and a cap screw that is receivable within corresponding apertures defined through each of the pivot support members and a corresponding aperture defined through a pivot member disposed on each of the handle assembly and battery source; and
   a plug that is insertable into the battery source and over the cap screw when the cap screw is engaged with the pivot member.

2. The protective case according to claim 1, wherein the protective case further comprises a snap lock area that is configured to couple to a corresponding snap tab that is disposed on each of the handle assembly and the battery source for maintaining the handle assembly and the battery source in the closed configuration when one of the handle assembly and the battery source is coupled to the protective case.

3. The protective case according to claim 2, wherein the protective case further comprises a pair of raised sidewalls each including a top edge that is flush with a back surface of one of the handle assembly and the battery source when one of the handle assembly and the battery source is coupled to the protective case and in the closed configuration, and wherein the snap lock area is defined in at least one of the pair of raised sidewalls.

4. The protective case according to claim 1, wherein the handle assembly includes a generally elongated configuration and, when in the open configuration is moveable from a retracted configuration, for coupling the handle assembly to the protective case, to one or more extended configurations, for allowing a user to perform at least one camera function of the mobile device.

5. The protective case according to claim 4, wherein the handle assembly comprises three telescoping members that allow the handle assembly to move between the one or more extended configurations, and wherein the three telescoping members integrate a mechanical lock out interface so as not to allow a user to overextend handle assembly.

6. The protective case according to claim 5, wherein the three telescoping members comprise an inner telescoping member, a middle telescoping member, and an outer telescoping member which includes a button for performing the at least one camera function of the mobile device.

7. The protective case according to claim 1, wherein the handle assembly is pivotable about the attachment device from about 0 degrees to about 270 degrees, and wherein the handle assembly is maintained in any position from 0 degrees and to about 270 via a frictional axle attachment device.

8. The protective case according to claim 1, wherein the handle assembly is in one of wired or wireless communication with the mobile device for performing at least one camera function of the mobile device.

9. The protective case according to claim 1, wherein the attachment device comprises at least one tab-lock area that is defined along a perimeter that defines the void and which is configured to engage a corresponding at least one tab-lock disposed on the handle assembly, the battery source, and fascia plate.

10. The protective case according to claim 1, wherein the attachment device comprises at least one tab slot that is disposed adjacent the void and which is configured to engage a corresponding at least one tab disposed on the handle assembly, the battery source, and fascia plate.

11. A protective case for use with a mobile device, the protective case comprising:
an attachment device;
a handle assembly that is configured to removably couple to the attachment device;
a battery source that is configured to removably couple to the attachment device;
wherein, when the handle assembly is coupled to the protective case, the handle assembly is configured to pivot about the protective case for moving the handle assembly from a closed configuration to an open configuration and, when the battery source is coupled to the protective case, the battery source is configured to charge the mobile device, and
wherein the attachment device comprises a pair of pivot support members and a cap screw that is receivable within corresponding apertures defined through each of the pivot support members and a corresponding aperture defined through a pivot member disposed on each of the handle assembly and battery source;
a plug that is insertable into the battery source and over the cap screw when the cap screw is engaged with the pivot member.

12. The protective case according to claim 11, wherein the protective case further comprises a snap lock area that is configured to couple to a corresponding snap tab that is disposed on each of the handle assembly and the battery source for maintaining the handle assembly and the battery source in the closed configuration when one of the handle assembly and the battery source is coupled to the protective case.

13. The protective case according to claim 12, wherein the protective case further comprises a pair of raised sidewalls each including a top edge that is flush with a back surface of one of the handle assembly and the battery source when one of the handle assembly and the battery source is coupled to the protective case and in the closed configuration, and wherein the snap lock area is defined in at least one of the pair of raised sidewalls.

14. The protective case according to claim 11, wherein the handle assembly includes a generally elongated configuration and, when in the open configuration is moveable from a retracted configuration, for coupling the handle assembly to the protective case, to one or more extended configurations, for allowing a user to perform at least one camera function of the mobile device.

15. The protective case according to claim 14, wherein the handle assembly comprises three telescoping members that allow the handle assembly to move between the one or more extended configurations, and wherein the three telescoping members integrate a mechanical lock out interface so as not to allow a user to overextend handle assembly.

16. The protective case according to claim 15, wherein the three telescoping members comprise an inner telescoping member, a middle telescoping member, and an outer telescoping member which includes a button for performing the at least one camera function of the mobile device.

17. The protective case according to claim 11, further comprising a fascia plate when a void is provided on the protective case, the fascia plate is configured to fill the void, that is otherwise filled by one of the handle assembly and the battery source.

18. A protective case for use with a mobile device, the protective case comprising:
an attachment device including at least one of at least one tab-lock area and at least one tab slot;
a handle assembly including at least one of at least one tab-lock and at least one tab that is configured to removably couple to a corresponding one of the at least one tab-lock and the at least one tab;
a battery source including at least one of at least one tab-lock and at least one tab that is configured to removably couple to a corresponding one of the at least one tab-lock and the at least one tab;
a fascia plate including at least one of at least one tab-lock and at least one tab that is configured to removably couple to a corresponding one of the at least one tab-lock and the at least one tab,
wherein, when the handle assembly is coupled to the protective case, the handle assembly is configured to pivot about the protective case for moving the handle assembly from a closed configuration to an open configuration, when the battery source is coupled to the protective case, the battery source is configured to charge the mobile device and, when the fascia plate is coupled to the protective case, the fascia plate is configured to fill a void that is otherwise filled by one of the handle assembly and the battery source, and
wherein the attachment device comprises a pair of pivot support members and a cap screw that is receivable within corresponding apertures defined through each of the pivot support members and a corresponding aperture defined through a pivot member disposed on each of the handle assembly and battery source; and a plug that is insertable into the battery source and over the cap screw when the cap screw is engaged with the pivot member.

* * * * *